United States Patent [19]

McDaniel

[11] 4,419,268

[45] Dec. 6, 1983

[54] PARTIALLY HYDROLYZED SILICATE TREATMENT OF CATALYST SUPPORT

[75] Inventor: Max P. McDaniel, Bartlesville, Okla.

[73] Assignee: Phillips Petroleum Company, Bartlesville, Okla.

[21] Appl. No.: 323,854

[22] Filed: Nov. 20, 1981

[51] Int. Cl.$^3$ ............................ C08F 4/24; C08F 4/02; B01J 31/02; B01J 31/34

[52] U.S. Cl. .................................. 502/158; 526/106; 502/162; 502/236; 502/323

[58] Field of Search ................... 252/426, 428, 431 R, 252/431 P, 437, 458, 430

[56] References Cited

U.S. PATENT DOCUMENTS

| | | | |
|---|---|---|---|
| 2,775,562 | 12/1956 | Dinwiddie et al. | 252/463 |
| 2,941,958 | 6/1960 | Conner, Jr. et al. | 252/449 |
| 3,248,179 | 4/1966 | Norwood | 526/64 |
| 3,425,958 | 2/1969 | Gentlet | 252/458 |
| 3,887,494 | 6/1975 | Dietz | 252/458 |
| 3,904,550 | 9/1975 | Pine | 252/437 |
| 3,948,806 | 4/1976 | Witt | 252/428 |
| 3,979,215 | 9/1976 | Emblem et al. | 106/55 |
| 4,151,122 | 4/1979 | McDaniel et al. | 252/458 |
| 4,219,444 | 8/1980 | Hill et al. | 252/437 |
| 4,301,034 | 11/1981 | McDaniel | 252/452 |

Primary Examiner—P. E. Konopka

[57] ABSTRACT

A silica-containing material or a phosphate is treated with a partially hydrolyzed silica. The resulting composition when used as a support for a chromium olefin polymerization catalyst exhibits beneficial characteristics in terms of effecting a desirable shift in molecular weight distribution without appreciably affecting other properties such as melt flow.

14 Claims, No Drawings

PARTIALLY HYDROLYZED SILICATE TREATMENT OF CATALYST SUPPORT

BACKGROUND OF THE INVENTION

This invention relates to treatment of catalyst supports.

Supported chromium oxide catalysts have become an important vehicle for polymerization of 1-olefins such as ethylene and predominantly ethylene copolymers. As originally commercialized, these polymerizations were carried out under solution conditions. However, it was early recognized that a more economical route to such polymers was to utilize a slurry system sometimes called a particle form system, wherein the polymerization is carried out at a low enough temperature that the resulting polymer is insoluble in the diluent. A great deal of technology has been developed on means to adapt catalysts to compensate for the inherent difficulty in slurry polymerization systems of achieving high enough flow in the resulting polymer. However, another polymer property which is important in many applications is the molecular weight distribution which has an effect on the response to shear. There are a substantial number of applications which require a higher shear response polymer than is normally produced with chromium catalysts in a slurry polymerization system.

SUMMARY OF THE INVENTION

It is an object of this invention to provide a catalyst system capable of giving high shear response polymer;

it is a further object of this invention to provide an improved chromium oxide catalyst system for olefin polymerization;

it is still yet a further object of this invention to provide an improved olefin polymerization process; and it is yet a further object of this invention to provide greater flexibility in the type of polymer which can be produced from a silica supported chromium catalyst system.

in accordance with this invention a silica-containing or phosphate support is treated with a partially hydrolyzed silicate.

DESCRIPTION OF THE PREFERRED EMBODIMENTS

The catalysts are formed from a two component system. Component (1) is a support material selected from silica-containing gel and phosphate gel. Component (2) is a partially hydrolyzed organosilicon compound.

When the support is a silica-containing material, the silica-containing material can be selected from catalytic grade silica, silica-alumina, silica-boria, silica-zirconia, and mixtures thereof in addition to silica-titania, the silica in each instance constituting from 80 to 100 weight percent, preferably greater than 90 weight percent of the silica-containing material. Preferably, the support in the case of a silica-containing material is a cogel, that is a silica produced by coprecipitating a titanium compound and silica as disclosed in Dietz, U.S. Pat. No. 3,887,494, issued June 3, 1975, the disclosure of which is hereby incorporated by reference. For instance, this cogel formation can be carried out by adding a titanium compound of a mineral acid, introducing an alkali metal silicate into the acid containing said titanium compound to form a hydrogel, aging the hydrogel for a time of greater than one hour, washing the thus aged hydrogel to produce a substantially alkali metal free hydrogel, forming a mixture comprising the thus washed hydrogel and a normally liquid oxygen-containing water soluble organic compound, and separating said organic compound and water from said mixture to form a xerogel after which the resulting composite is dried of solvent. The titanium is present in these cogels in an amount within the range of 0.1 to 20, preferably 0.5 to 5 weight percent titanium based on the weight of the dried cogel (xerogel). It can also be a coprecipitated silica-titania-chromium tergel.

In the case of a phosphate support, conventional techniques can be used to produce the support as disclosed in Hill, U.S. Pat. No. 4,219,444, the disclosure of which is hereby incorporated by reference. In this method, an aluminum salt is combined with a source of phosphate ions in an aqueous medium and neutralized with a neutralizing agent to give a hydrogel. Alternatively, a polar organic solvent can be used. The second method of forming the phosphate gel is to combine an aluminum alkoxide with phosphoric acid to give a hydrogel directly as disclosed in Pine, U.S. Pat. No. 3,904,550, the disclosure of which is hereby incorporated by reference. Third, an aluminum salt which will melt can be used, with the source of phosphate ions combined with the melt and then neutralized to give the hydrogel. Generally, those aluminum salts with a sufficiently low melting point are hydrated. Orthophosphoric acid, orthophosphates such as monoammonium phosphate and diammonium hydrogen phosphate or mixtures of monoammonium and diammonium phosphate are preferred sources of phosphate ions. In a variation of this third method, a concentrated syrup of an aluminum salt is used. Thus, the third method can be broadly viewed as employing a concentrated mass of the acid phase, source of aluminum and source of orthophosphate ions. Alternatively, in the third method and possibly the first method, the aluminum-phosphate composition can be only partially neutralized and allowed to sit as a strongly acid composition until gellation occurs spontaneously.

Component (2) of the system comprises a partially hydrolyzed silicon tetrahydrocarbyloxide which is formed, for instance, in an organic solvent by partly hydrolyzing a silicon tetraalkoxide with less than the stoichiometric amount of water in the presence of a small amount of an acid such as sulfuric acid, and thereafter neutralizing the acid solution by bubbling in ammonia gas or an amine. The stoichiometric amount of water is 2 moles water to 1 mole silicon compound. The resulting by-product salts are volatilized during catalyst activation. Since hydrolysis is incomplete, gellation does not occur and a mixture comprising microscopic particles of partially hydrolyzed silicon tetrahydrocarbyl oxide suspended in the liquid results. Component (1) is then impregnated with sufficient of the mixture of influence its catalytic prperties, e.g, from about 1 to about 20 weight percent perferably from about 5 to about 20 weight percent based on the dry weight of the mixture.

The silicon tetrahydrocarbyl oxide can be expressed by the formula $Si(OR)_4$ where R is a hydrocarbyl radical containing from 1 to about 12 carbon atoms selected from alkyl, cycloalkyl, aryl and combinations such as alkaryl. The R groups can be alike or different.

Examples of suitable compounds include silicon tetramethoxide, silicon tetraethoxide, silicon tetra-n- butoxide, silicon tetradodecyloxide, silicon tetracyclohexyloxide, silicon tetraphenoxide, silicon tetrabenzyloxide, and the like with silicon tetraalkoxides such as silicon tetraethoxide (ethyl orthosilicate) in particular being preferred because of availability.

The mole ratio of water to silicon tetrahydrocarbyloxide (silicate) employed in the hydrolysis can range from any amount effecting some hydrolysis up to near the stoichiometric amount causing gellation to occur. Thus, the mole ratio of water:silicate can vary, for example, from about 0.05:1 to about 1.95:1 and more generally from about 0.5:1 to about 1.5:1.

The reaction is preferably carried out in an organic solvent inert in the reaction such as alkanols, paraffins, aromatic hydrocarbons, alkyl esters and the like. For convenience, however, especially when silicon tetraalkoxides are to be employed, it is desirable to select an alkanol identical to the one produced in the hydrolysis to thus simplify recovery and separation of solvent in any subsequent operation.

The partial hydrolysis of the silicon compound results in the formation of materials like siloxane polymers (except they are not likely to be linear) which can contain several silicon atoms in the molecule, e.g. about 5 in the case of the polymeric form of silicon tetraethoxide. The use of such compounds as the initial compounds in the hydrolysis reaction can also be practised providing the final compound is soluble in the organic solvent to facilitate impregnation of the silica or phosphate gel. The partial hydrolysis can be depicted in general terms as follows:

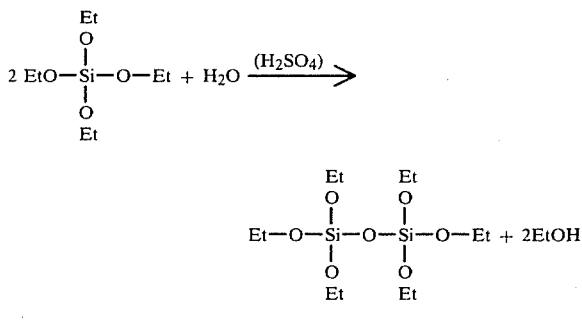

To this material,

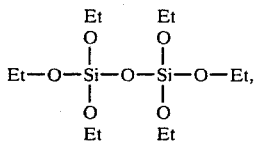

can be added more units to give $[Si(OEt)_n-O_m]_x$, where x can range from 1 to about 100 and the end groups are Et, and $n+m=4$.

This partially hydrolyzed organosilicon compound can be added to the silica or phosphate gel either at the hydrogel stage or the xerogel stage. With the silica support, it is preferred to add the partially hydrolyzed organosilicon compound anhydrously to the silica gel after removal of water by azeotropic distillation or washing with a water soluble volatile organic compound.

The final product may be called a partially hydrolyzed silicate ester. Alternatively, it can be called silica organosol based on its physical characteristics, namely particles in suspension which are not large enough to precipitate and not sufficiently hydrolyzed to gel.

The final solid catalyst contains chromium generally in an amount from 0.001 to 10, preferably 0.1 to 5, more preferably 0.5 to 1 weight percent chromium based on the weight of the silica-containing or phosphate-containing base.

The chromium can be added at the hydrogel stage, preferably as an aqueous solution of a water soluble chromium compound such as $CrO_3$ or chromium acetate or it can be added as an anhydrous solution of a material such as t-butyl chromate, to the xerogel. Alternatively, the chromium can be coprecipitated with the silica or phosphate. In the case of a silica support, it is frequently desirable to have titania present in which case the chromium can be coprecipitated with the silica and titania to give a tergel or the chromium can be added to the titanium-containing gel in the manner previously described.

The catalysts of this invention are suitable for the production of normally solid ethylene homopolymer and also for the production of predominantly ethylene copolymers. Ethylene can be copolymerized with one or more higher aliphatic mono-1-olefins containing from 3 to about 10 carbon atoms such as propylene, 1-butene, 1-pentene, 1-hexene, 1-octene and/or a conjugated diolefin containing 4 to about 12 carbon atoms. In such polymers, the ethylene content generally ranges from about 97 to 99.6 weight percent which is obtained using from about 93 to 99.6 weight percent ethylene monomer, the remainder being said higher olefin comonomer or comonomers. Broadly, ethylene copolymers can be made using 80 to 99.8 weight percent ethylene and 20 to 0.2 weight percent comonomer in the feed.

The polymerization can be carried out under solution or slurry polymerization processes although slurry or particle form conditions are preferred. Slurry conditions are disclosed, for instance, in Norwood, U.S. Pat. No. 3,248,179, issued Apr. 26, 1966, the disclosure which is hereby incorporated by reference. Briefly, this can be accomplished, for example, by conducting the polymerization in the presence of a dry inert hydrocarbon diluent such as isobutane, n-heptane, methylcyclohexane, or benzene at a reactor temperature within the range of about 60° to about 110° C. and a reactor pressure of about 1.7 to about 4.1 MPa (250 to 600 psia). The polymer can be recovered, treated with $CO_2$ or $H_2O$, for example, to deactivate residual catalyst, stabilized with an antioxidant, such as butylated hydroxytoluene (BHT), and dried by conventional methods to obtain the final product. Hydrogen can be used in the reactor as known in the art to provide some control of the molecular weight of the polymer. The polymerization can be conducted batchwise in a stirred reactor reactor or continuously in a loop reactor with or without a settling leg or in a series of reactors.

The recovered polymers can be converted into such useful articles as fiber, film, containers and the like by employing conventional plastic fabrication equipment, e.g. extruders, blow molders, and injection molders, for instance.

EXAMPLES

A. A partially hydrolyzed silicon tetrahydrocarbyloxide was prepared by reacting for one hour at 25° C. with stirring, 25 mL (23.3 g, 0.112 mole) of silicon tetraethoxide, 15 mL (11.8 g, 0.197 mole) of 2-propanol, 2.5 mL (0.138 mole) of deionized water and one drop of concentrated sulfuric acid (96%). The reaction mixture was then diluted to a volume of 350 mL by adding to it 307.5 mL (242.6 g, 4.04 moles) of 2-propanol and ammonia gas was bubbled through the final mixture until it became basic, e.g., pH of about 8 as determined by pH paper strips. The equivalent amount of silica contained in the mixture was calculated to be 6.7 g. The calculated mole ratio of water to silicon compound was 1.2:1. The mixture was used to impregnate a silica titania cogel as described in part B.

B. A 98/2 weight percent silica/titania cogel prepared as described in U.S. Pat. No. 3,887,494, after aging and washing, was impregnated with sufficient $CrO_3$ to provide 1 weight percent chromium as chromium oxide based on the weight of the calcined product, and the mixture was freed of water by azeotrope distillation with ethyl acetate. The yellowish-green ethyl acetate wet product was employed in the next step.

130 g of ethyl acetate wet gel from said azeotrope distillation, equivalent to about 32.5 g dry gel, was charged to a distillation flask containing about 400 mL of ethyl acetate and the mixture was refluxed for 10 minutes. Refluxing was discontinued and the part A product was added to the flask and thoroughly admixed with it. No color change was noted with the addition of the part A product. Solvent was then mostly removed by distillation and the product dried in a vacuum oven at about 100° C. to substantially remove the remaining solvent(s). The amount of silica originating from the partially hydrolyzed silicon tetraethoxide in the composition was calculated to be about 17 weight percent. The dry mixture was calculated to contain about 0.83 weight percent chromium as $CrO_3$.

C: Activation of the catalyst was carried out by fluidizing a 10 g portion of it in an electrically heated quartz tube of 46 mm OD with about 42 L per hour gas at STP by employing the following sequence of steps. The catalyst was heated to 871° C. in carbon monoxide and held at that temperature for 3 hours. The temperature was then reduced to 593° C. as nitrogen was used to replace the carbon monoxide, the step consuming about 25 minutes. Dry air was then substituted for the nitrogen and the heating at 593° C. was continued for 2 hours. Heating was then discontinued, the invention catalyst was recovered and stored in dry air until ready for testing. This activation sequence is disclosed in U.S. Pat. No. 4,151,122.

The control catalyst, absence the added silica from the partly hydrolyzed silicon tetraethoxide was activated as the invention catalyst in part C.

D: Ethylene polymerization

Ethylene was polymerized in a 2 L stirred, stainless steel reactor employing about 1 L (600 g) of isobutane as diluent at a nominal reactor pressure of 565 psia (3.90 MPa) to give polymer yields of about 5,000 g per g catalyst. Melt index values, determined according to ASTM D 1238-62T, Condition E (g/10 min), are adjusted to productivity values of 5,000 g polymer per g catalyst as disclosed in U.S. Pat. No. 4,151,122, columns 7 and 8. High load melt index and the HLMI/MI ratio and its significance are also described in Column 8 of the patent.

The reactor temperatures, catalyst weights, and results are given in the Table.

TABLE I

| | | | Ethylene Polymerization | | | | |
|---|---|---|---|---|---|---|---|
| Run No. | Catalyst Weight, g | Reactor Temp. °C. | Productivity g/g Catalyst | Run Time Min. | Corrected MI g/10 min | HLMI/MI | Remarks |
| 1 | 0.0238 | 102 | 5290 | 34 | 1.1 | 64 | Control |
| 2 | 0.0480 | 102 | 4340 | 50 | 1.1 | 81 | Invention |
| 3 | 0.0250 | 107 | 4960 | 30 | 4.5 | 45 | Control |
| 4 | 0.0421 | 107 | 5320 | 65 | 4.7 | 54 | Invention |

Inspection of the data presented in the table reveals that the melt index capability of the invention catalyst is essentially unaffected by the presence of the silica furnished by the partly hydrolyzed silicon tetraethoxide. Thus at a reactor temperature of 102° C., polymer made with invention catalyst or control catalyst exhibits a melt index of about 1.2. Similarly, at 107° C., each catalyst produces polymer having a melt index of about 4.6.

Based on the HLMI/MI results, it is clear that the invention catalyst produces at either reactor temperature a polymer exhibiting a different shear response than the control polymer having about the same melt index. It is thought that as the HLMI/MI ratio increases a broader molecular weight distribution polymer may result. The results show that modifying the prior art silica-titania-chromium oxide catalyst with additional silica as taught by this invention can give a catalyst that yields polymers having a broadened molecular weight distribution.

Thus, the molecular weight distribution of polymers such as cogel polymers can be significantly broadened by impregnating into the gel, for instance during azeotrope drying, a neutralized anhydrous silica sol. In the examples, a silica sol was prepared in alcohol solution by partially hydrolyzing an organosilicon compound with sulfuric acid with a less than stoichiometric amount of water. Afterward, the acid solution was neutralized with gaseous ammonia to form microscopic particles of partially hydrolyzed silicate. Since the hydrolysis was incomplete, gellation did not occur and this sol was impregnated onto the cogel catalyst during drying. While applicant does not wish to be bound by theory, this appears to affect a beneficial result by changing the porosity of the catalyst.

While this invention has been described in detail for the purpose of illustration, it is not to be construed as limited thereby but is intended to cover all changes and modifications within the spirit and scope thereof.

I claim:

1. A process for producing a catalyst comprising combining a silica organosol produced by the partial hydrolysis of a silicate ester to give an organosilicon compound having a plurality of silicon atoms per molecule with a support selected from a silica-containing material which is 80-100 weight percent silica or an aluminium phosphate to form a catalyst base, said base containing in addition a chromium compound.

2. A method according to claim 1 wherein said support is said silica-containing material.

3. A method according to claim 2 wherein said silica organosol is formed by using a ratio of water to said silicate ester within the range of 0.5:1 to 1.5:1.

4. A method according to claim 2 wherein said silica organosol is produced from a silicon tetrahydrocarbyloxide of the formula $Si(OR)_4$ where R is a hydrocarbyl radical containing from 1 to about 12 carbon atoms selected from alkyl, cycloalkyl, aryl, and combinations thereof, said R groups being alike or different.

5. A method according to claim 2 wherein said silica-containing material is a silica-titania chromium tergel.

6. A method according to claim 2 wherein said silica-containing material is a silica-titania cogel.

7. A method according to claim 6 wherein said cogel is produced by adding a silicate to a mineral acid containing a titanium compound, aging, washing with water to produce a substantially alkali metal free hydrogel and removing water by washing or azeotropic distillation with a normally liquid volatile organic compound.

8. A method according to claim 7 wherein said silica organosol is added to said cogel subsequent to said water removal and thereafter the resulting composition is dried of solvent.

9. A method according to claim 8 wherein said silica organosol is impregnated into said cogel in an amount sufficient to give from 5 to 20 weight percent of said organosilicon compound based on the dry weight of the combined support and organosilicon compound, said titanium is present in an amount within the range of 0.5 to 5 weight percent based on the dry weight of said cogel and said chromium compound is present in an amount sufficient to give chromium in an amount within the range of 0.1 to 5 weight percent based on the weight of said catalyst after drying.

10. A method according to claim 9 wherein said silica organosol is produced from silicon tetraethoxide, sulfuric acid catalyst is used to effect said partial hydrolysis and a ratio of water to silicon compound is 1.2:1.

11. A method according to claim 10 wherein said chromium is added as an aqueous solution to said hydrogel.

12. A method according to claim 11 wherein said catalyst is activated by sequentially heating in carbon monoxide and thereafter air.

13. A catalyst produced by the method of claim 12.

14. A catalyst produced by the method of claim 1.

* * * * *